United States Patent [19]

Hart

[11] 4,441,159

[45] Apr. 3, 1984

[54] DIGITAL ADDER CIRCUIT FOR BINARY-CODED NUMBERS OF RADIX OTHER THAN A POWER OF TWO

[75] Inventor: Peter A. Hart, Cheadle, England

[73] Assignee: International Computers Ltd., Stevenage, England

[21] Appl. No.: 281,300

[22] Filed: Jul. 7, 1981

[30] Foreign Application Priority Data

Jul. 10, 1980 [GB] United Kingdom ............... 8022572

[51] Int. Cl.³ ............................................. G06F 7/50
[52] U.S. Cl. .................................................. 364/771
[58] Field of Search ..................... 364/771, 772, 788

[56] References Cited

U.S. PATENT DOCUMENTS

| | | | |
|---|---|---|---|
| 3,100,835 | 8/1963 | Bedrij ................................ | 364/788 |
| 3,339,064 | 8/1967 | Koizumi et al. ................... | 364/771 |
| 3,711,693 | 1/1973 | Dahl ................................... | 364/771 |
| 3,743,824 | 7/1973 | Smith ................................. | 364/788 |
| 3,935,438 | 1/1976 | Grupe ................................ | 364/771 |
| 3,958,112 | 5/1976 | Miller ................................ | 364/771 X |
| 3,991,307 | 11/1976 | Peddle et al. ..................... | 364/771 X |
| 4,172,288 | 10/1979 | Anderson .......................... | 364/771 |
| 4,203,157 | 5/1980 | Daniels et al. .................... | 364/788 |
| 4,245,328 | 1/1981 | Negi et al. ........................ | 364/771 |

OTHER PUBLICATIONS

Townsend "Serial Digital Adders for a Variable Radix of Notation", *Electronic Engineering*, Oct. 1953, pp. 410–416.

Nguyen, "Practical Hardware Solutions for 2's Complement Arithmetic Problems", *Computer Design*, Jul. 1979, pp. 105–112.

*Primary Examiner*—David H. Malzahn
*Attorney, Agent, or Firm*—Lee, Smith & Jager

[57] ABSTRACT

A digital adder circuit for binary-coded-decimal operation, comprising a set of multiplexers (11) which are conditioned with a pattern of input bits causing them to form an intermediate result (IR) equal to the sum of the two operands (A0–A3, B0–B3) plus a correction value of six. The intermediate result is adjusted by subtracting the correction value if the intermediate result is less than sixteen. The circuit is also operable in a pure binary mode, or can be made to perform various logical operations.

6 Claims, 7 Drawing Figures

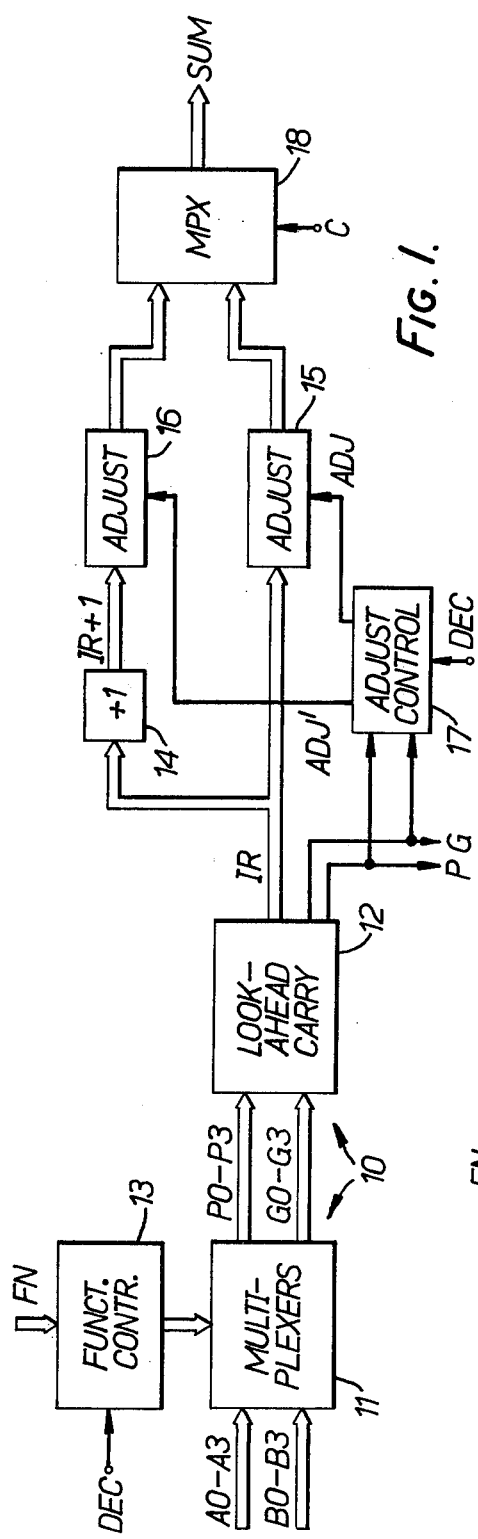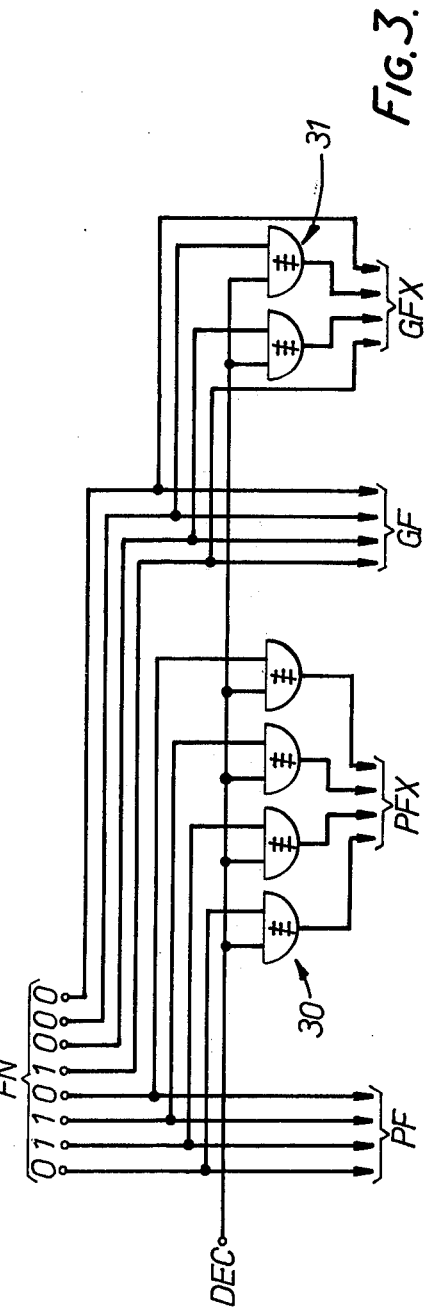

DIGITAL ADDER CIRCUIT FOR BINARY-CODED NUMBERS OF RADIX OTHER THAN A POWER OF TWO

BACKGROUND TO THE INVENTION

This invention relates to digital adder circuits.

Adder circuits are known which are capable of adding operands of radix other than a power of two e.g. decimal operands. For example, U.S. Pat. No. 4,172,288 describes a method of adding two binary decimal (BCD) operands by first adding the operands as if they were pure binary numbers to form an intermediate result, and then, if necessary, adding a correction value of six to the intermediate result to give the correct BCD result. The condition for adding the correction value is that the intermediate result is grgreater than or equal to ten. However, a problem with this is that a normal binary adder does not have any logic for detecting whether the sum is greater than or equal to ten. As a result, special logic must be provided to do this.

U.S. Pat. No. 3,958,112 describes an alternative arrangement in which the correction value of six is always added to one of the operands before the operands are added together and then, if necessary, the correction value is subtracted from the result. The condition for subtracting the correction value is that the result of the addition is less than sixteen, which is an easy condition to detect since it is simply the inverse of the normal binary adder overflow condition. However, the addition of the correction value before the addition of the operands introduces an extra stage which slows down the overall operation of the circuit.

One object of the present invention is to avoid this reduction of operating speed.

SUMMARY OF THE INVENTION

According to the invention, there is provided a digital adder circuit operable to form the sum of two n-bit operands representing binary-coded numbers of radix other than a power of two, wherein a correction value equal to the difference between $2^n$ and said radix is added to the operands and the operands are added together as if they were pure binary numbers to form an intermediate result, and wherein the correction value is subtracted from the intermediate result if the intermediate result is less than $2^n$, characterised in that the addition of the correction value is performed by the same logic circuit as performs the binary addition of the operands, simultaneously with said binary addition.

In a preferred form of the invention, the adder circuit comprises:

(a) a plurality of multiplexers each having two selection control inputs and four data inputs, corresponding pairs of bits of the two operands being fed to the selection control inputs of the respective multiplexers; and (b) a control circuit for applying a pattern of bits to the data inputs of the multiplexers such as to condition the multiplexers to produce output signals corresponding to the binary sum of the two operands plus the correction value.

(By a multiplexer is meant a circuit which is capable of selecting one of a plurality of data inputs to provide a data output.)

The use of multiplexers in this way is particularly advantageous, since it permits the addition of the correction value with virtually no extra circuitry over and above that required to perform the addition of the two operands. Moreover, by conditioning the multiplexers with different patterns of bits, the circuit can be made to perform pure binary addition or various logic functions.

The use of multiplexers to perform logical functions is known per se. For example, U.S. Pat. No. 4,157,589 describes the use of multiplexers to perform a binary full-adder function. However, the use of multiplexers to perform the addition of a correction value, simultaneously with the addition of two operands, has never before been suggested.

BRIEF DESCRIPTION OF THE DRAWINGS

One digital adder circuit in accordance with the invention will now be described, by way of example, with reference to the accompanying drawings, of which:

FIG. 1 is a block diagram of the adder circuit;

FIG. 3 shows a function control circuit for controlling the multiplexers;

BLOCK DIAGRAM

Figure 2:
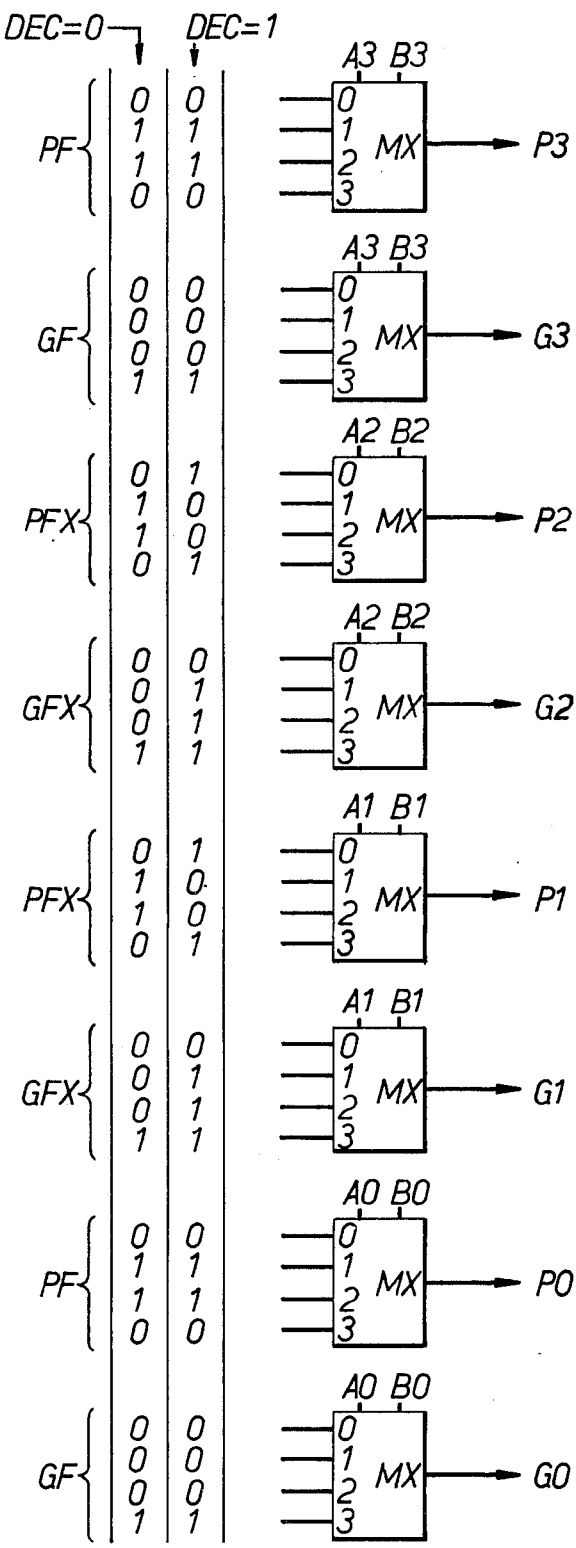
FIG. 2 shows a set of multiplexers forming part of the adder circuit.

As shown in FIG. 1, the digital adder circuit receives two four-bit operands AO-A3, BO-B3 (where AO and BO are the most significant bits) and produces a four-bit sum output SUM. The circuit also receives a carry-in signal C.

The circuit is designed to form one stage of a multistage adder with look-ahead carry between the stages. This means that, instead of providing a carry-out signal, it produces a carry propagate signal P and a carry generate signal G. The propagate signal P signifies that this stage propagates any carry-in applied to it, i.e. that the carry-in to the next stage should be equal to the carry-in C to this stage. The generate signal G indicates that this stage generates a carry i.e. that the carry-in to the next stage must be one, irrespective of the value of the carry in to this stage. The principles of look-ahead carry addition are well known (see for example an article by O. L. MacSorley entitled "High Speed Arithmetic in Binary Computers", Proceedings of the IRE, January 1961, pages 67-91) and so will not be described in detail herein.

The two operands AO-A3, BO-B3 are applied to a binary adder 10, consisting of a group of multiplexers 11 and a look-ahead carry circuit 12. The multiplexers 11 operate on each corresponding pair of bits Ai, Bi (where i=0,1,2,3) to produce inter-bit propagate and generate signals Pi and Gi. The look-ahead carry circuit 12 receives these signals and produces a four-bit intermediate result signal IR, and also produces the interstage propagate and generate signals P and G.

The multiplexers 11 are controlled by a function control circuit 13 which is in turn controlled by a set of function control bits FN, and a decimal operation control signal DEC. The signal DEC determines the mode of operation for addition; in a first mode (DEC=0) the operands AO-A3, BO-B3 are treated as binary numbers, whereas in a second mode (DEC=1) they are treated as binary-coded decimal numbers.

In the first mode of operation (DEC=0), the adder 10 acts as a normal binary look-ahead carry adder. However, in the second mode (DEC=1) the adder forms the sum of the two operands AO-A3, BO-B3 plus a correction value of six (binary 0110). In either case, it should be noted that the addition is performed without any carry-in, since the value of the carry-in signal C is not yet available at this stage of operation. The addition is performed on the assumption that the carry-in is zero.

The intermediate result signal IR is applied to an incrementer circuit 14 which increments it by one to produce a signal IR+1 which represents the value required for the intermediate result when the carry in C is one.

The signal IR and IR+1 are applied to respective decimal adjustment circuits 15 and 16 each of which is selectively operable to subtract the decimal correction value of six. The circuits 15, 16 are respectively controlled by signals ADJ and ADJ$^1$ from a decimal adjustment control circuit 17. This circuit 17 is in turn controlled by the signal DEC and by the inter-stage propagate and generate signals P and G.

The outputs of the decimal adjustment circuits 15 and 16 are applied to a multiplexer 18, controlled by the carry-in signal C, which selects the output of circuit 15 when C=0, and the output of circuit 16 when C=1. The selected signal appears at the output of the multiplexer 18 as the final result SUM.

MULTIPLEXERS

Referring to FIG. 2, the group of multiplexers 11 consists of four pairs of multiplexers MX, one pair for each corresponding pair of operands bits Ai,Bi (i=0,1,2,3). The outputs of each pair represent the corresponding interbit generate and propagate signals Gi and Pi.

As shown, each multiplexer MX has four data bit inputs 0–3, which are connected to receive a four-bit control signal PF, PFX, GF or GFX as shown. These signals are derived from the function control unit 13. Each multiplexer also has two selection control inputs, which are connected to receive the corresponding operand bits Ai, Bi.

CONTROL CIRCUIT

The control signals PF, PFX, GF, GFX are obtained from the control circuit 13 which is shown in detail in FIG. 3. The control circuit derives these signals from an 8-bit function control input signal FN as follows:

PF is derived directly from the four most significant bits of FN.

PFX is derived from the four most significant bits of FN by way of a set of exclusive -OR gates 30 which are controlled by the decimal mode control signal DEC. When DEC=0, the gates 30 allow signals to pass through without modification so that PFX is equal to PF. When DEC=1, the gates 30 act as inverters and hence PFX is equal to the inverse of PF.

GF is derived directly from the four least significant bits of FN.

GFX is also derived from the four least significant bits of FN. The first and last bits are derived directly, while the middle two bits pass through two exclusive -OR gates 31 which invert these two middle bits when DEC=1.

When it is desired to add two operands AO-A3 and BO-B3, the function code FN is given the value of 0110 1000 as shown in FIG. 3. The resulting values of the control signals are as follows:

|         | PF   | PFX  | GF   | GFX  |
|---------|------|------|------|------|
| DEC = 0 | 0110 | 0110 | 1000 | 1000 |
| DEC = 1 | 0110 | 1001 | 1000 | 1110 |

The resulting patterns of bits applied to the data inputs of the multiplexers MX are shown in FIG. 2, in which the first column shows the pattern when DEC=0 (pure binary mode) and the second column shows the pattern when DEC=1 (decimal mode).

OPERATION OF THE MULTIPLEXERS

It can readily be seen by inspection of FIG. 2 that, when DEC=0, the multiplexers MX are conditioned to produce the correct values for Pi and Gi appropriate to pure binary addition of the two operands, according to the equations $Pi = Ai$ XOR $Bi$ $Gi = Ai$ AND $Bi$ (where XOR denotes the exclusive -OR function).

Similarly, it can be seen that, when DEC=1, the multiplexers are conditioned to produce the correct values of Pi and Gi appropriate to the formation of the sum of the two operands plus the correction value six (binary 0110).

It should be noted that the addition of the correction value is performed integrally and simultaneously with the addition of the two operands, and hence does not take any extra time.

The multiplexers 11 are capable of performing operations other than simple addition, by application of different patterns of control bits FN; for example, binary and decimal subtraction and reverse subtraction, multiplication by 2 of either operand, and logical operations. In the case of these logical operations, GF is always set to 0000, DEC is always zero, and the remaining control bits PF determine the logical function to be performed between the operands A and B as follows:

| PF   | Function            |
|------|---------------------|
| 0000 | 0                   |
| 0001 | $\overline{A + B}$  |
| 0010 | $\underline{A} \cdot \overline{B}$ |
| 0011 | $\overline{A}$      |
| 0100 | $\underline{A} \cdot B$ |
| 0101 | $\overline{B}$      |
| 0110 | A XOR B             |
| 0111 | $\overline{A \cdot B}$ |
| 1000 | A · B               |
| 1001 | $\overline{A\ XOR\ B}$ |
| 1010 | B                   |
| 1011 | $\overline{A} + B$  |
| 1100 | A                   |
| 1101 | $A + \overline{B}$  |
| 1110 | A + B               |
| 1111 | 1                   |

By manipulating GF with the PF bits it is possible to combine the logical and arithmetic operations.

LOOK-AHEAD CARRY CIRCUIT

Figure 4:
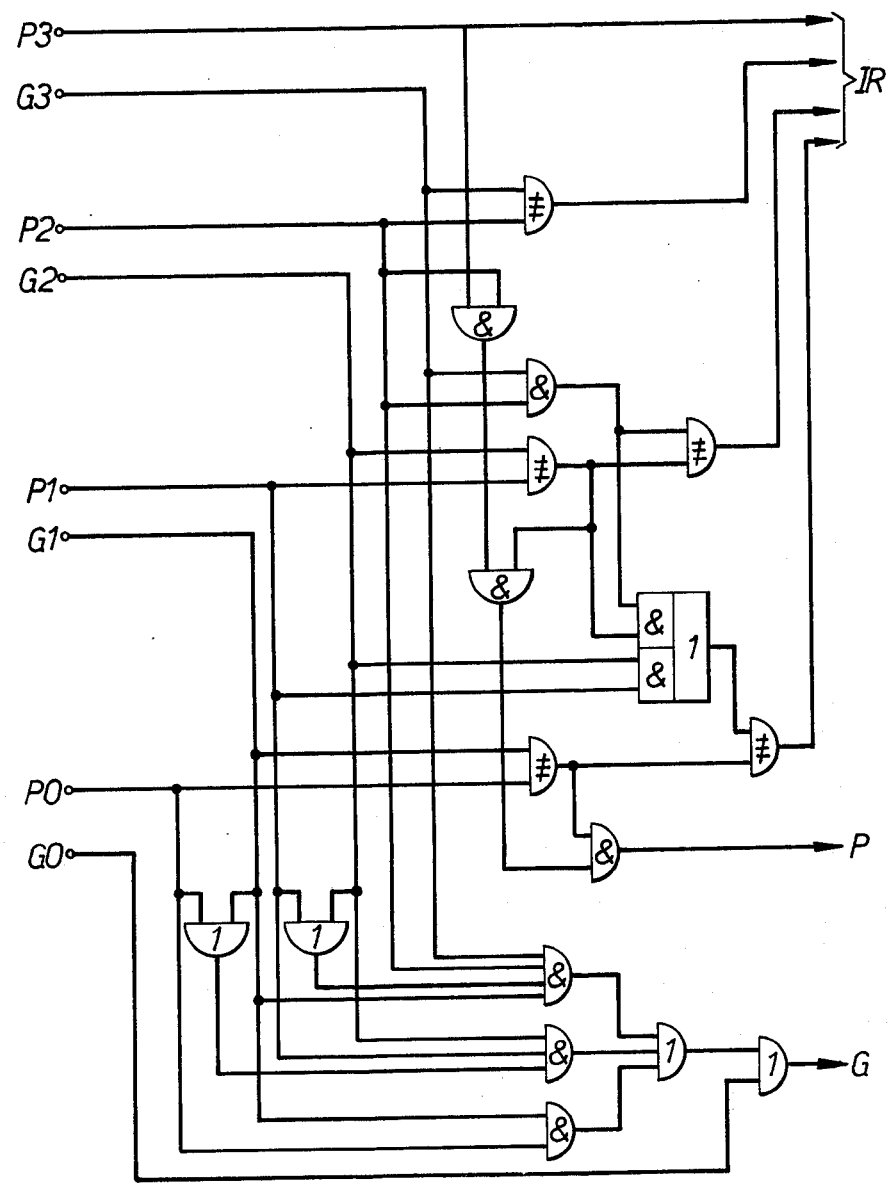
FIG. 4 shows a look-ahead carry circuit.

FIG. 4 shows the look-ahead carry circuit 12 in detail. This combines the four pairs of propagate and generate signals Pi, Gi from the multiplexers 11, to produce the intermediate result signal IR, taking account of any inter-bit carries. The circuit caters for the possibility of both Pi and Gi being "1" simultaneously, which can occur in decimal operation. (For simple binary addition Pi and Gi are mutually exclusive). It also produces the inter-stage propagate and generate signals P and G. It is believed that the operation of the look-ahead carry circuit shown in FIG. 4 is self-explanatory and so it will not be described in detail herein.

INCREMENTER CIRCUIT

Figure 5:
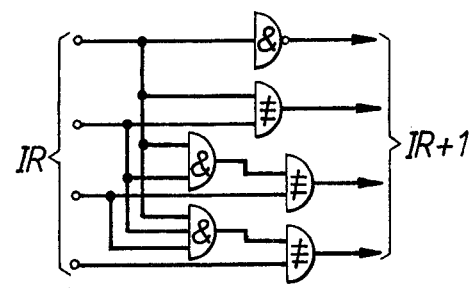
FIG. 5 shows an incrementer circuit.

FIG. 5 shows the incrementer circuit 14 in detail. This circuit takes the four-bit intermediate result signal IR and increments it by one to form the signal IR+1. It is believed that the operation of this circuit is self-explanatory.

DECIMAL ADJUSTMENT CIRCUITS

Figure 6:
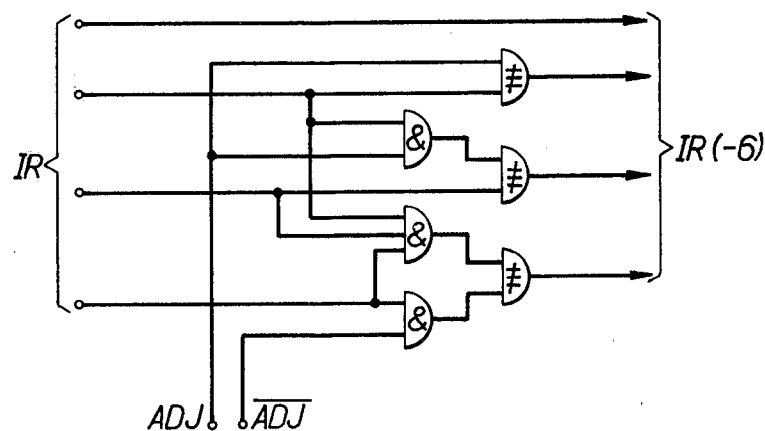
FIG. 6 shows a decimal adjustment circuit.

FIG. 6 shows the decimal adjustment circuit 15 in detail. This circuit is controlled by the signal ADJ and its inverse $\overline{ADJ}$, from the control circuit 17. When ADJ=0, the output of this circuit equals its input. However, when ADJ=1, the circuit operates to subtract six (binary 0110) from the input. It should be noted that, because of the addition of six performed by the binary adder 10, the circuit 15 will never be called upon to subtract six from an input value less than six. This simplifies the design of the circuit 15.

The other decimal adjustment circuit 16 is identical to this circuit, except that the control signal is $ADJ^1$ and its inverse $\overline{ADJ^1}$, and the input is IR+1.

DECIMAL ADJUSTMENT CONTROL CIRCUIT

Figure 7:
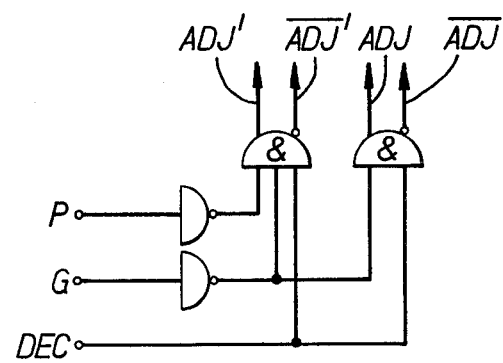
FIG. 7 shows a decimal adjustment control circuit for controlling the decimal adjustment circuit.

FIG. 7 shows the decimal adjustment control circuit 7 in detail. This circuit produces the control signals ADJ and $ADJ^1$ (and also their inverses $\overline{ADJ}$ and $\overline{ADJ^1}$) for the two correction circuits 15 and 16. When DEC=0, both ADJ and $ADJ^1$ are zero; this is because no decimal adjustment is required in the binary mode of operation.

ADJ=1 whenever DEC=1 and no carry-out is indicated for the binary adder 10, assuming a carry-in value of C=0. This will be the case if G=0. On the other hand, $ADJ^1$=1 whenever DEC=1 and no carry-out is indicated for the binary adder 10 assuming a carry-in value of C=1. This will be the case if both G=0 and P=0.

I claim:

1. A digital adder circuit operable to form the sum of two n-bit operands representing binary-coded numbers of radix other than a power of two, comprising
    (a) a plurality of multiplexers each having two selection control inputs, four data inputs, and a data output,
    (b) means for feeding corresponding pairs of bits of the two operands to the selection control inputs of the respective multiplexers, and
    (c) means for applying a predetermined pattern of bits to the data inputs of the multiplexers to condition the multiplexers to produce, at their data outputs, inter-bit carry generate and carry propagate signals corresponding to the binary addition of the two operands plus a correction value equal to the difference between $2^n$ and said radix.

2. A digital adder circuit according to claim 1 further including
    (a) a look-ahead carry circuit responsive to said inter-bit carry generate and carry propagate signals, for producing an intermediate result,
    (b) adjustment control means coupled to said look-ahead carry circuit for detecting when said intermediate result is less than $2^n$, and
    (c) adjustment means connected to receive said intermediate result and responsive to said adjustment control means to subtract said correction value from said intermediate result when said intermediate result is less than $2^n$.

3. A digital adder circuit according to claim 2 further including
    (a) incrementing means connected to receive said intermediate result and to increment the intermediate result by one, and
    (b) selecting means responsive to a carry-in signal for selecting said intermediate result when the carry-in is equal to zero, and selecting the incremented intermediate result when the carry-in is equal to one.

4. A digital adder circuit according to claim 1 wherein said plurality of multiplexers comprises
    (a) a first set of n multiplexers for producing the carry generate signals, and
    (b) a second set of n multiplexers for producing the carry propagate signals.

5. A digital adder circuit according to claim 4 wherein
    (a) the value of n is four,
    (b) said radix is ten, and
    (c) said correction value is six.

6. A digital adder circuit according to claim 5 wherein said predetermined pattern of bits comprises
    (a) a first pattern of bits 1000 1110 1110 1000 applied to said first set of multiplexers, and
    (b) a second pattern of bits 0110 1001 1001 0110 applied to said second set of multiplexers.

* * * * *